(12) United States Patent
Takahashi et al.

(10) Patent No.: US 10,178,637 B2
(45) Date of Patent: Jan. 8, 2019

(54) METHOD FOR DUAL CONNECTIVITY, MOBILE DEVICE, AND BASE STATION APPARATUS

(71) Applicant: NTT DOCOMO, INC., Tokyo (JP)

(72) Inventors: Hideaki Takahashi, Tokyo (JP); Tooru Uchino, Tokyo (JP); Wuri Andarmawanti Hapsari, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 26 days.

(21) Appl. No.: 15/111,306

(22) PCT Filed: Jan. 19, 2015

(86) PCT No.: PCT/JP2015/051195
§ 371 (c)(1),
(2) Date: Jul. 13, 2016

(87) PCT Pub. No.: WO2015/115222
PCT Pub. Date: Aug. 6, 2015

(65) Prior Publication Data
US 2016/0330704 A1 Nov. 10, 2016

(30) Foreign Application Priority Data

Jan. 28, 2014 (JP) .............................. 2014-013744

(51) Int. Cl.
*H04W 56/00* (2009.01)
*H04W 76/27* (2018.01)
(Continued)

(52) U.S. Cl.
CPC ......... *H04W 56/002* (2013.01); *H04W 48/12* (2013.01); *H04W 72/005* (2013.01); *H04W 76/27* (2018.02)

(58) Field of Classification Search
CPC . H04W 56/002; H04W 48/12; H04W 72/005; H04W 76/046; H04W 76/27
See application file for complete search history.

(56) References Cited

U.S. PATENT DOCUMENTS

| | | | |
|---|---|---|---|
| 2012/0177006 A1* | 7/2012 | Tsai | H04W 36/08 370/331 |
| 2014/0307729 A1* | 10/2014 | Son | H04J 11/0056 370/350 |
| 2016/0374142 A1* | 12/2016 | Kato | H04W 52/0238 |

FOREIGN PATENT DOCUMENTS

| | | | |
|---|---|---|---|
| WO | 2013081293 A1 | 6/2013 | |
| WO | WO 2013081293 A1 * | 6/2013 | .......... H04J 11/0056 |

OTHER PUBLICATIONS

International Search Report issued in PCT/JP2015/051195 dated Apr. 14, 2015 (2 pages).
(Continued)

*Primary Examiner* — Jianye Wu
(74) *Attorney, Agent, or Firm* — Osha Liang LLP

(57) ABSTRACT

In dual connectivity or inter-base station carrier aggregation, synchronization between base stations is achieved while preventing processing load from increasing in user equipment. A method of acquiring broadcast information when configuring or performing inter-base station carrier aggregation in a mobile communication system including a first base station, a second base station, and a mobile device connected to the first base station, includes the steps of, at the first base station, creating first broadcast information about the second base station, except for information as to synchronization between base stations and supplying the first broadcast information to the mobile device on a dedicated radio resource control signal; and at the mobile device, after receiving the dedicated radio resource control signal, receiving the information as to synchronization between
(Continued)

base stations over a physical broadcast channel of a first cell of the second base station based upon the first broadcast information.

9 Claims, 4 Drawing Sheets

(51) Int. Cl.
*H04W 48/12* (2009.01)
*H04W 72/00* (2009.01)

(56) References Cited

OTHER PUBLICATIONS

Written Opinion of the International Searching Authority issued in PCT/JP2015/051195 dated Apr. 14, 2015 (4 pages).
NTT DOCOMO, Inc.; "System Information handling for Dual Connectivity"; 3GPP TSG-RAN WG2 #85, R2-140432; Prague, Czech Republic; Feb. 10-14, 2014 (5 pages).
3GPP TR 36.842 V12.0.0; "3rd Generation Partnership Project; Technical Specification Group Radio Access Network; Study on Small Cell enhancements for E-UTRA and E-UTRAN; Higher layer aspects (Release 12)"; Dec. 2013 (71 pages).
European Search Report issued in corresponding European Application No. 15743674.2, dated Jan. 11, 2017 (10 pages).

\* cited by examiner

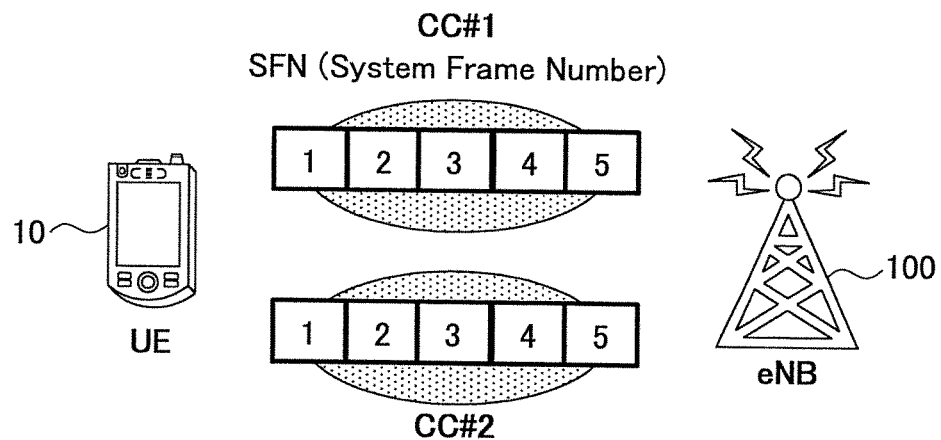
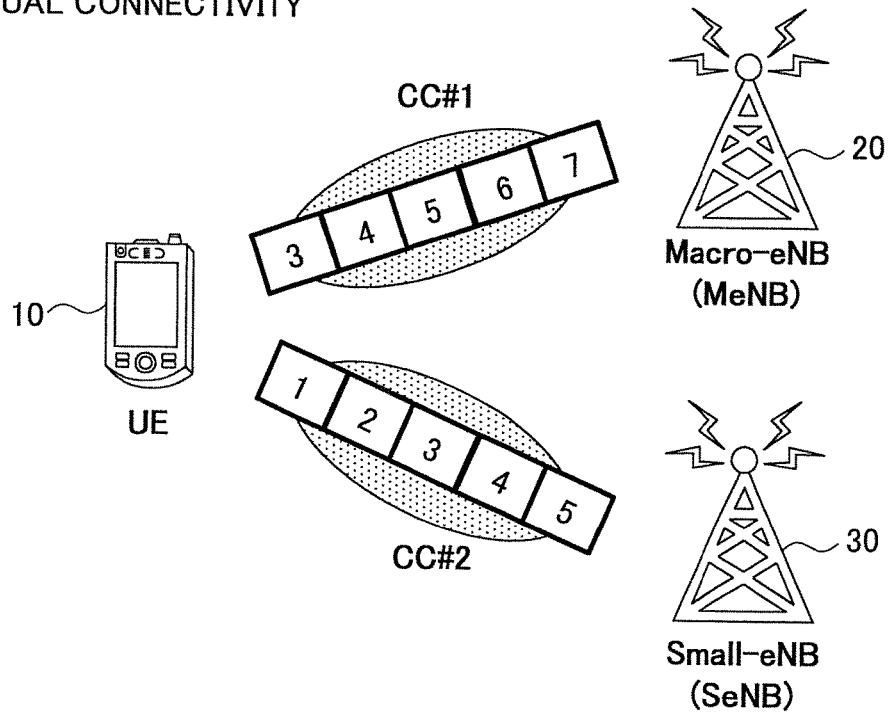
FIG.1B

METHOD FOR DUAL CONNECTIVITY, MOBILE DEVICE, AND BASE STATION APPARATUS

TECHNICAL FIELD

The present invention relates to the field of mobile telecommunications, and more particularly, to a technique of acquiring broadcast information when carrier aggregation between different base stations (also called "dual connectivity") is configured.

BACKGROUND ART

Third Generation Partnership Project (3GPP) specifications provide carrier aggregation (CA) for bundling multiple component carriers (CCs) to perform radio communications.

Carrier aggregation up to Long Term Evolution (LTE) Release 10 increases the throughput by simultaneously using multiple component carriers operated in a single evolved node B (abbreviated as "eNB" that stands for a base station).

In Release 12, "dual connectivity" is discussed, which technique expands intra-eNB carrier aggregation and achieves simultaneous communications using components carriers operated at different eNBs. See, for example, non-patent document 1 listed below. Dual connectivity corresponds to inter-eNB carrier aggregation and further improvement of the throughput is expected.

For example, when all the necessary component carriers are not accommodated in a single eNB, dual connectivity is an effective technique to achieve as high the throughput as in Release 10.

In intra-eNB carrier aggregation, a mobile station or user equipment (UE) configured with carrier aggregation is adapted to acquire broadcast information of the secondary cell (SCell) generally from the primary cell (PCell) through dedicated radio resource control (RRC) signaling. The SCell broadcast information contained in the RRC signals is the minimum required information for the UE that undergoes the carrier aggregation, namely the UE in the "RRC_CONNECTED" state, to transmit and receive data to and from the SCell. In other words, those information items unnecessary for carrier aggregation (e.g., information items used in the idle state) are not contained in dedicated RRC signals.

By acquiring SCell broadcast information through dedicated RRC signaling, the UE need not perform blind decoding on a physical downlink control channel (PDCCH) common search space on the SCell. This arrangement can reduce the processing workload and the power consumption at the UE.

The broadcast information of the PCell is acquired at the UE in the same manner as the ordinary communications process with no carrier aggregation set up. That is, a master information block (MIB) which is first read upon completion of cell search is acquired over a physical broadcast channel (PBCH), and the other system information items are acquired over a physical downlink shared channel (PDSCH). A system frame number (SFN) is contained in the MIB.

As illustrated in FIG. 1A, under intra-eNB carrier aggregation, component carriers (CCs) from cells of the same eNB are in SFN synchronization, operated at the same SFN timings. Upon receiving a PBCH from the PCell that supports CC#1, the UE 20 can know the SFN of the SCell and it is unnecessary for the UE 20 to receive a PBCH from the SCell.

LIST OF RELATED DOCUMENTS

Non-Patent Document 1: 3GPP TR36.842

SUMMARY OF THE INVENTION

Technical Problem to be Solved

As illustrated in FIG. 1B, with dual connectivity, the UE performs date communications simultaneously with different base stations (for example, a master base station referred to as "MeNB" and a secondary base station referred to as "SeNB"). In this case, the SFNs of these base stations do not agree with each other unless these eNBs are synchronized with each other by means of global positioning system (GPS) or the like.

If the same architecture as intra-eNB carrier aggregation is employed in the circumstance where inter-base station synchronization is not provided, the UE will only receive a dedicated RRC signaling message and won't receive broadcast information (PBCH) from the SCell (or secondary CC) of the SeNB 30. In this case, the UE cannot know the SFN of the SeNB.

On the other hand, if an architecture that the UE receives broadcast information (PDSCH) of the SeNB 30 without using dedicated RRC signaling is employed, the processing workload and the power consumption increase at the UE.

To solve these problems, a method and a structure are provided to realize synchronization with base stations when UE is configured with or operated in dual connectivity or inter-eNB CA, while preventing the processing workload of the UE from increasing.

Means for Solving the Problem

In the first aspect of the invention, a broadcast information acquiring method for inter-base station carrier aggregation in a mobile communication system including a first base station, a second base station, and a mobile device connected to the first base station is provided. The method includes the steps of at the first base station, creating first broadcast information about the second base station, except for information as to synchronization between base stations, and providing the first broadcast information to the mobile device by a dedicated radio resource control signal; and at the mobile device, after receiving the dedicated radio resource control signal, receiving the information as to synchronization between base stations over a physical broadcast channel of a first cell of the second base station based upon the first broadcast information.

In the second aspect of the invention, a mobile device includes a radio communication unit configured to receive a dedicated radio resource control signal that includes a request for configuring and/or changing inter-base station carrier aggregation, and a broadcast signal about a second base station to be involved in the inter-base station carrier aggregation except for information as to synchronization between base stations from a first base station to which the mobile device is connected;

a signal processor configured to extract broadcast information from the dedicated radio resource control signal; and a controller configured to instruct the radio communication unit to receive the information as to synchronization between base stations over a physical broadcast channel of a first cell of the second base station based upon the broadcast information.

In the third aspect of the invention, a base station apparatus for communicate with a mobile device in a mobile communication system includes a radio resource control manager configured to determine configuring and/or changing inter-base station carrier aggregation for the mobile device;

a signal generator configured to generate a dedicated radio resource control signal to be transmitted to the mobile device, based upon the determination of the inter-base station carrier aggregation; and a radio communication unit configured to transmit the dedicated radio resource control signal, wherein the signal generator is configured to include broadcast information about a component carrier of the second base station to be involved in the inter-base station carrier aggregation, except for information as to synchronization between base stations, in the dedicated radio resource control signal.

Advantageous Effect of the Invention

With the above-described method and structures, synchronization with base stations can be realized in dual connectivity (or inter-eNB CA), while preventing the processing workload of UE from increasing.

BRIEF DESCRIPTION OF THE DRAWINGS

FIG. 1A is a diagram to explain a conventional technique of carrier aggregation;

FIG. 1B is a diagram to explain a technical problem arising when broadcast information acquisition of conventional intra-base station carrier aggregation is applied as it is to dual connectivity (or inter-eNB CA);

EMBODIMENTS TO CARRY OUT THE INVENTION

Figure 2:
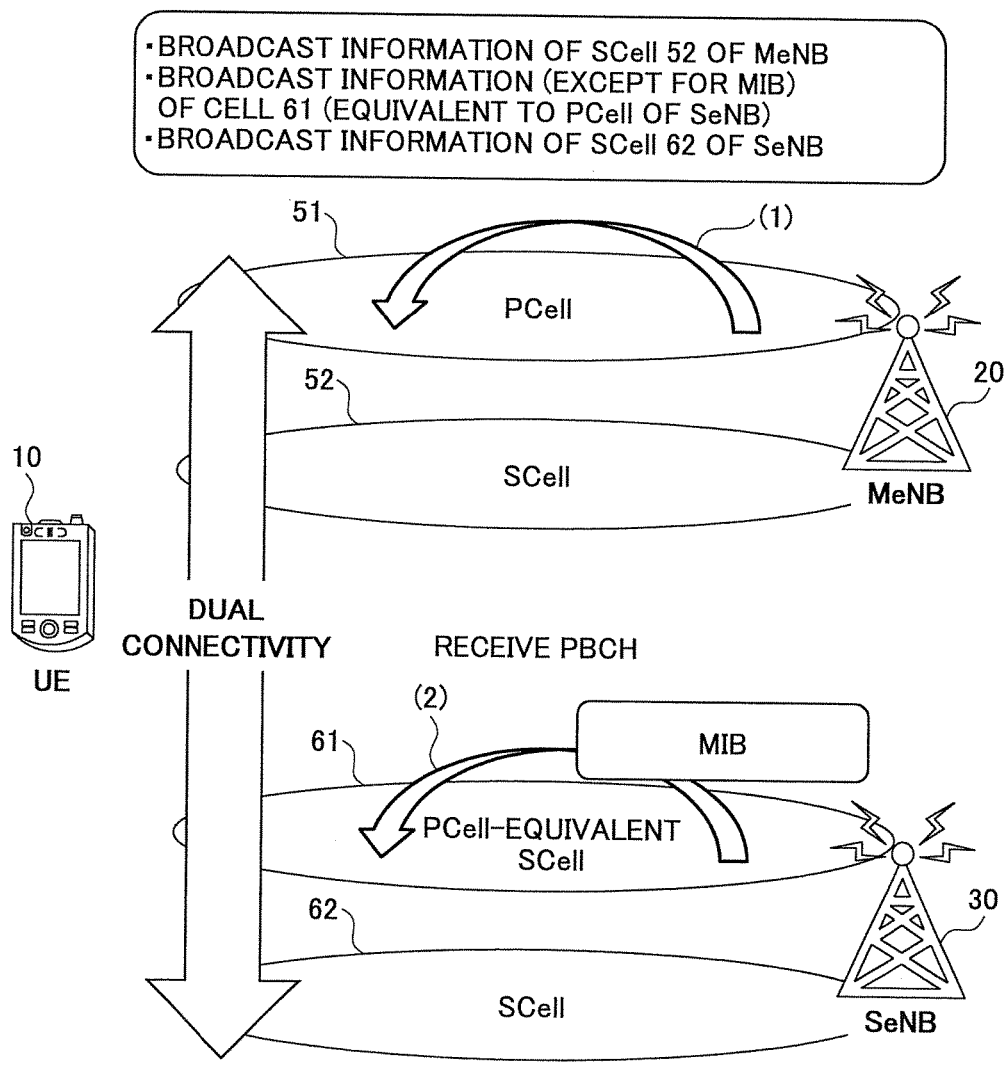
FIG. 2 is a diagram to explain acquisition of broadcast information when dual connectivity is set up or implemented according to the embodiment.

FIG. 2 schematically illustrates acquisition of broadcast information performed when dual connectivity (or inter-eNB CA) is configured or implemented according to the embodiment.

In FIG. 2, UE 10 has been connected with a master base station (MeNB) 20 on PCell 51. The MeNB 20 is, for example, a macro base station. Let's assume that the amount of data to or from the UE 10 increases extremely and additional component carrier(s) is/are required. If all the data can be accommodated in the MeNB 20 using the component carriers supported at the MeNB 20, then the MeNB 20 configures the UE 10 with intra-eNB carrier aggregation and adds, for example, SCell 52.

If the resources of the component carriers in the MeNB 20 are insufficient for the data, the MeNB 20 configures UE 10 with dual connectivity and adds a component carrier (or a cell) 61 and/or a component carrier (or a cell) 62 supported by the secondary base station (SeNB) 30. The SeNB 20 is, for example, a small base station such as a pico eNB.

For the UE 10, both the first cell 61 and the second cell 62 of the SeNB 20 are SCells. However, focusing on the serving area of the SeNB 30, the first cell 61 serves as the primary cell (PCell) that transmits control signals. In this regard, the first cell 61 of the SeNB 30 may be called "PCell-equivalent cell".

Upon being configured with dual connectivity, the MeNB 20 informs the UE of the fact that a SCell has been added over dedicated RRC signaling on the PCell 51 (indicated by the white arrow (1)). Although FIG. 2 illustrates a scenario where a cell is added upon being configured with dual connectivity, any changes in cell configuration such as adding or deleting a cell during implementation of dual connectivity may be reported to the UE over dedicated RRC signaling. Prior to RRC signaling, negotiation may be conducted between the MeNB 20 and the SeNB 30 as to adding SeNB 30.

The contents of the dedicated RRC signaling message transmitted to the UE 10 when setting up or implementing dual connectivity may include, but are not limited to, the following items.

(a) Broadcast information (system information block "SIB") of SCell 52 when using SCell 52 of MeNB 20 for carrier aggregation;

(b) Broadcast information (except for MIB) of the first cell (or the PCell-equivalent cell) 61 of SeNB 30; and (c) Broadcast information of the second cell 62 of SeNB.

The reason why the master information block (MIB) of the first cell 61 of the SeNB 30 is not included in the RRC signaling message is that the SFN in the MIB is a dynamic parameter changing from moment to moment and unsuitable for dedicated signaling.

Upon receiving the dedicated RRC signaling, the UE 10 performs cell search on the SeNB 30 based upon the broadcast information (except for MIB) of the first cell 61 of the SeNB 30 contained in the dedicated RRC signaling message, and then receives a MIB over a PBCH from the first cell 61 of the SeNB (indicated by the white arrow (2).

The UE 10 reads the SFN contained in the MIB and synchronizes itself with the SeNB 30 as with the NeNB 20, and starts the random access procedure. Upon establishing connection with SeNB 30, the UE 20 carries out simultaneous communications using the cells (or CCs) 61 and 62 of the SeNB 30 as well as the cells (or CCs) 51 and 52 of the MeNB 20.

Because it is assumed that the SFNs of the cells 61 and 62 under the same SeNB 30 agree with each other, the UE need not receive MIB over the physical broadcast channel from the second cell 62 as long as the SFN of the first cell 61 is known. Accordingly, the broadcast information of the second cell 62 from the SeNB 30 contained in the dedicated RRC signaling message may be a SIB and a MIB except for SFN.

With this method, the UE can acquire the SFN of the SeNB 30 without significantly increasing the processing workload under asynchronous dual connectivity between different eNBs (base stations). Unlike a SIB transmitted over a PDSCH, MIBs are transmitted over a PBCH which is a fixed broadcast information resource and the processing workload of blind decoding of PDCCH is not affected.

Figure 3:
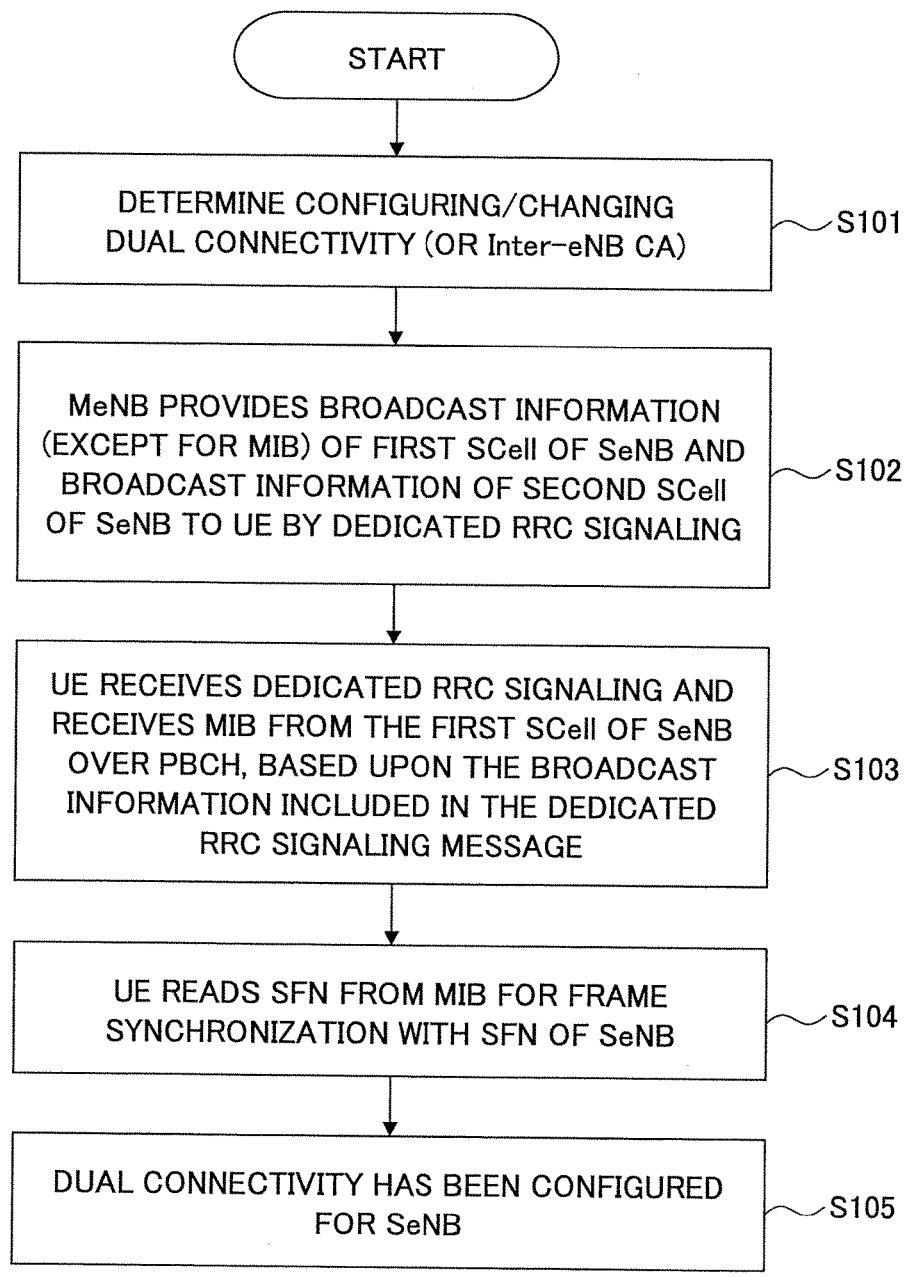
FIG. 3 is a flowchart of a broadcast information acquiring method performed when dual connectivity (or inter-eNB CA) is configured or implemented according to the embodiment.

FIG. 3 is a flowchart of a broadcast information acquiring method according to the embodiment. When implementing dual connectivity (or inter-eNB CA) (S101), the NeNB 20, which may be the first base station, informs the UE 10 of the fact that the first cell 61 and the second cell 62 of the SeNB 30 are added as SCells by dedicated RRC signaling (S102). The SeNB 30 is the second base station to be involved in dual connectivity or inter-eNB CA. The dedicated RRC signaling message includes broadcast information except for MIB of the first cell 61 of the SeNB. Concerning the process for adding the second cell 52 of the MeNB 20, it is the same as that of the conventional intra-eNB CA and explanation for it is omitted.

The UE 10 receives the dedicated RRC signaling message and then receives a MIB from the first cell 61 of the SeNB 30 over a PBCH based upon the broadcast information included in the dedicated RRC signaling message (S103). The UE 10 reads the SFN from the MIB to synchronize itself with the SeNB 30 (S104). Then, the UE 10 informs the NeNB 20 of the completion of the dual connectivity setup process (S105). The UE 10 performs the random access procedure to the SeNB 30, and then carries out simultaneous communications using the cells 51 and 52 of the NeNB 20 and the cells 61 and 62 of the SeNB 30.

Figure 4:
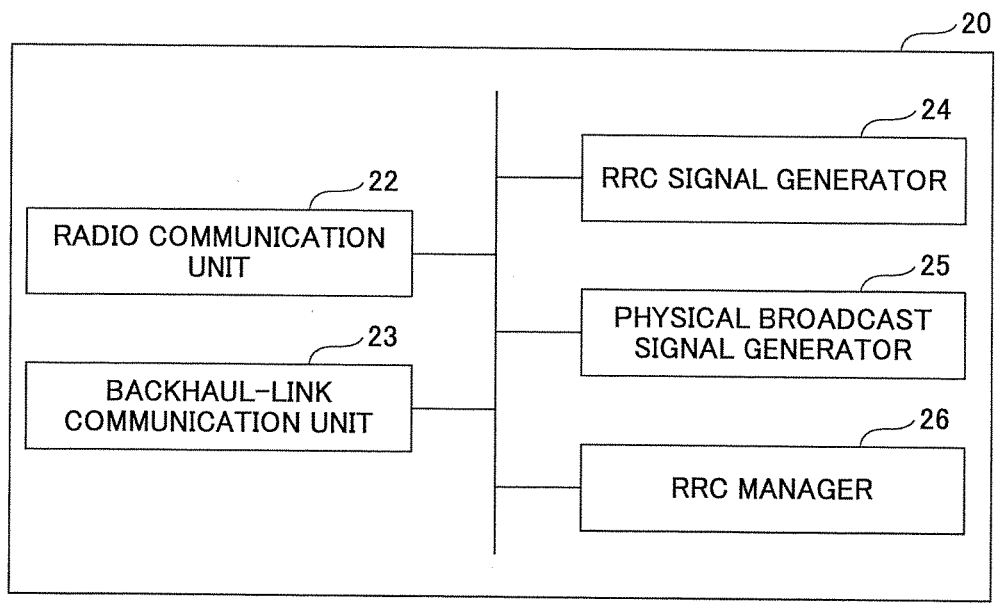
FIG. 4 is a schematic diagram of a base station apparatus according to the embodiment.

FIG. 4 is a schematic diagram of the NeNB 20, which corresponds to a base station apparatus 20, according to the embodiment. The base station apparatus 20 has a radio communication unit 22, a backhaul communication unit 23, an RRC signal generator 24, a physical broadcast signal generator 25, and an RRC manager 26.

The RRC manager 26 manages resources (including component carriers). When a large volume of data to or from the UE 10 has arisen, the RRC manager 26 starts a process for configuring the UE 10 with dual connectivity. When the condition of the component carriers has change during the implementation of dual connectivity, the RRC manager 26 may determine to change the configuration of the cells used for dual connectivity. The RRC manager 26 creates a request message for adding a SCell, which cell to be added may be a cell from the SeNB, and transmits the request message from the backhaul communication unit 23 to the SeNB 30 as a target eNB for the dual connectivity or CA.

When the agreement has been established between the RRC manager 26 of the base station apparatus 20 and the SeNB 30, the RRC signal generator 24 creates a dedicated RRC signaling message containing broadcast information for the UE 10. The dedicated RRC signaling message includes broadcast information (except for MIB) of the first cell 61 of the SeNB 30 which cell is to undergo dual connectivity or CA. In the case where the SCell 52 of the MeNB 20 is added together with the cell 61, the broadcast information of the SCell 52 is also included in the dedicated RRC signaling message. The generated dedicated RRC signaling message is transmitted from the radio communication unit 22.

The physical broadcast signal generator 25 generates a physical broadcast signal to be transmitted over a PBCH of the PCell 51 of the MeNB 20. The physical broadcast signal includes a MIB containing a SFN of the MeNB 20. The generated physical broadcast signal is transmitted from the radio communication unit 22 over a radio channel.

Figure 5:
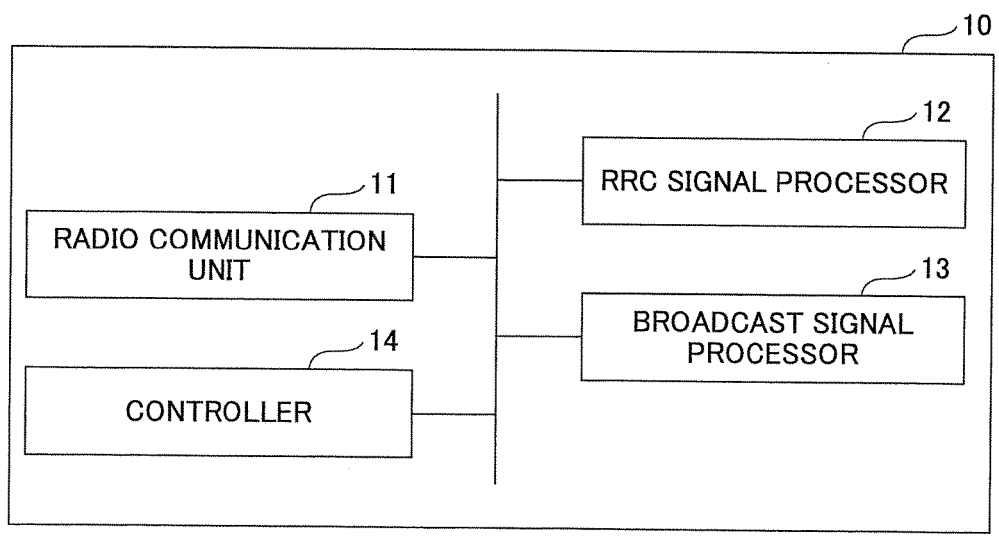
FIG. 5 is a schematic diagram of a mobile device according to the embodiment.

FIG. 5 is a schematic diagram of the UE 10, which corresponds to a mobile device 10, according to the embodiment. The mobile device 10 has a radio communication unit 11, an RRC signal processor 12, a physical broadcast signal processor 13, and a controller 14. The RRC signal processor 12 processes the dedicated RRC signaling message received at the radio communication unit 11 and extracts a broadcast information item (SIB). When there is an information item about implementation of or change in dual connectivity (such as one for configuring, adding, or changing SCell of SeNB 30) in the dedicated RRC signaling message, the controller 14 instructs the radio communication unit 11 to carry out cell search based upon the broadcast message in the dedicated RRC signaling message and receive a PBCH from the second base station (SeNB) 30. The broadcast signal processor 13 takes an SFN out of the broadcast information (MIB) on the PBCH and supplies the SFN to the controller 14. The controller 14 synchronizes the mobile device 10 with the second base station (SeNB) 30.

With the above-described structure and method, synchronization with base stations can be established by acquiring the SFN of the newly added base station (SeNB) when setting or implementing dual connectivity, while preventing the processing workload of the UE 10 from increasing.

The structure and the method of the embodiment are only examples of establishing synchronization with base stations when performing dual connectivity, and the invention is not limited to these examples. For example, instead of transmitting from the MeNB 20 a dedicated RRC signaling message excluding the entirety of the MIB of the first cell 61 of the SeNB 30, only the SFN may be excluded from the dedicated RRC signaling message. The MIB information other than the SFN of the first cell 61 of the SeNB 30 may be included in the dedicated RRC signaling message. In this case, the UE 10 extracts only the SFN from the MIB received over the PBCH from the first cell 61 of the SeNB 30.

This patent application is based upon and claims the benefit of the priority of the Japanese Patent Application No. 2014-013744 filed Jan. 28, 2014, which is incorporated herein by reference in its entirety.

What is claimed is:

1. A method for dual connectivity in a mobile communication system including a first base station, a second base station, and a mobile device connected to the first base station, the method comprising:
   at the first base station, sending, to the mobile device, system information for adding a cell of the second base station by a dedicated radio resource control signal when the second base station is added as a base station used for the dual connectivity, wherein the system information for adding the cell of the second base station does not include a system frame number; and
   at the mobile device, receiving the system information, and receiving the system frame number over a physical broadcast channel of a first cell of the second base station,
   wherein the mobile device simultaneously communicates with the first base station and the second base station in the dual connectivity.

2. The method as claimed in claim 1,
   wherein the system frame number is included in a master information block of the first cell of the second base station, and
   wherein the mobile device receives the master information block over the physical broadcast channel and acquires the system frame number from the master information block.

3. A method for dual connectivity in a mobile communication system including a first base station, a second base station, and a mobile device connected to the first base station, the method comprising:
   at the first base station, sending system information for adding a cell of the second base station, except for information for performing radio frame synchronization, to the mobile device by a dedicated radio resource control signal when the second base station is added as a base station used for the dual connectivity; and at the mobile device, according to information provided by the dedicated radio resource control signal, receiving the information for performing the radio frame synchronization over a physical broadcast channel of a first cell of the second base station, wherein the mobile device simultaneously communicates with the first base station and the second base station in the dual connectivity.

4. A mobile device comprising:

a radio communication unit configured to receive a dedicated radio resource control signal that includes system information for adding a cell of a second base station when the second base station is added as a base station used for dual connectivity, wherein the system information for adding the cell of the second base station does not include a system frame number; and a controller configured to instruct the radio communication unit to receive the system frame number over a physical broadcast channel of a first cell of the second base station, wherein the mobile device simultaneously communicates with a first base station and the second base station in the dual connectivity.

5. The mobile device as claimed in claim 4, wherein the system frame number is included in a master information block transmitted over the physical broadcast channel of the first cell of the second base station, and wherein the controller is configured to acquire the system frame number from the master information block.

6. A mobile device comprising:

a radio communication unit configured to receive a dedicated radio resource control signal that includes system information for adding a cell of a second base station when the second base station is added as a base station used for dual connectivity, except for information for performing radio frame synchronization, from a first base station to which the mobile device is connected; and a controller configured to instruct the radio communication unit to receive the information for performing radio frame synchronization over a physical broadcast channel of a first cell of the second base station according to information provided by the dedicated radio resource control signal, wherein the mobile device simultaneously communicates with the first base station and the second base station in the dual connectivity.

7. A first base station for communicate with a mobile device in a mobile communication system, comprising:

a radio resource control manager that configures the mobile device with dual connectivity; and a radio communication unit configured to transmit system information for adding a cell of a second base station when the second base station is added as a base station used for the dual connectivity by a dedicated radio resource control signal, wherein the system information for adding the cell of the second base station does not include a system frame number, and wherein the mobile device simultaneously communicates with the first base station and the second base station in the dual connectivity.

8. The first base station as claimed in claim 7, wherein the system frame number is included in a master information block of a first cell of the second base station.

9. A first base station for communicating with a mobile device in a mobile communication system, comprising:

a radio resource control manager that configures the mobile device with dual connectivity; and a radio communication unit configured to transmit a dedicated radio resource control signal to the mobile device upon configuration of the dual connectivity, wherein the dedicated radio resource control signal includes system information for adding a cell of a second base station when the second base station is added as a base station used for the dual connectivity, except for information for performing radio frame synchronization, and wherein the mobile device simultaneously communicates with the first base station and the second base station in the dual connectivity.

* * * * *